June 23, 1925.  P. E. BURNS  1,543,246

SNAP CATCH FOR HOOKS

Filed June 7, 1924

Peter E. Burns — INVENTOR.

BY Parsons & Bodell — ATTORNEYS.

Patented June 23, 1925.

1,543,246

UNITED STATES PATENT OFFICE.

PETER E. BURNS, OF SYRACUSE, NEW YORK, ASSIGNOR OF ONE-HALF TO FRANK L. MORSE, OF ITHACA, NEW YORK.

SNAP CATCH FOR HOOKS.

Application filed June 7, 1924. Serial No. 718,441.

*To all whom it may concern:*

Be it known that I, PETER E. BURNS, a citizen of the United States, residing at Syracuse, in the county of Onondaga and State of New York, have invented a certain new and useful Snap Catch for Hooks, of which the following is a specification.

This invention has for its object a particularly simple and efficient means or clip for preventing a detachment of hooks, open links and the like from the members with which they are engaged, which clip is particularly simple and economical in construction and readily applied and removed without the use of special tools. The invention consists in the novel features and in the combinations and constructions hereinafter set forth and claimed. This clip is particularly designed for use in connection with the cross members or chains of nonskid tire chains used on the tires of motor vehicles and is particularly advantageous in that it permits the cross chains to be readily removed when broken without the use of special tools and a new one quickly applied without tools, or without special tools.

In describing this invention, reference is had to the accompanying drawing in which like characters designate the corresponding parts in all the views.

Figure 1:
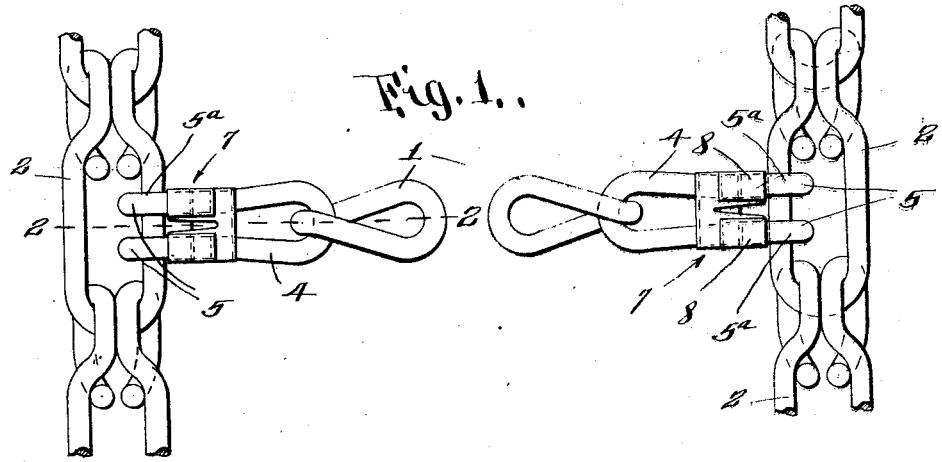
Figure 1 is a fragmentary plan view of a cross chain provided with my invention, the contiguous portions of the side members or chains being also shown.
Figures 2, 3:
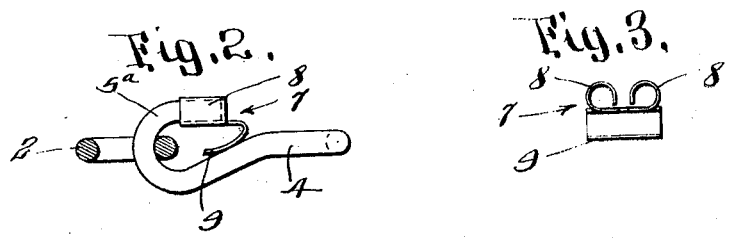
Figure 2 is a sectional view on line 2—2, Figure 1.
Figure 3 is a detail view of the clip.

1 designates the cross member of a non-skid or tire chain, and 2 the side members. Both of these members are usually link chains, although they may be other forms of cables or chains. The cross members have links 4 at their ends, each of which is formed with hooks 5 arranged in substantial parallelism for engaging the side chains, the bills of the hooks being spaced apart from the body of the link, forming an open eye 6 in which the side chains are hooked. Heretofore these end links, after being hooked on to the side chains, have been bent down by pliers to close the eye and when a cross chain becomes broken it is necessary to pry open the hooks to detach the cross chain and this operation is extremely difficult, especially on the road or in cold weather. If a cross chain is not removed soon after it is broken, the fragments thereof damage the fender of the vehicle and oftentimes wear a hole through the fender. By the use of my clip, the broken cross chain can be instantly removed and replaced by a new cross chain.

The clip 7 for closing the eye of each end link of the cross chain comprises tubular passages 8 slidable on the bills $9^a$ of the hooks and a leaf or closure 9 arranged transversely of the tubular passages 8 and at an angle thereto, this leaf being arranged to extend across the entrance of the eye and frictionally engage the portions of the link opposed to the bills of the hooks. The leaf is preferably formed arc shape in order that it may be resilient and have a snap catch action.

Figures 4, 5:
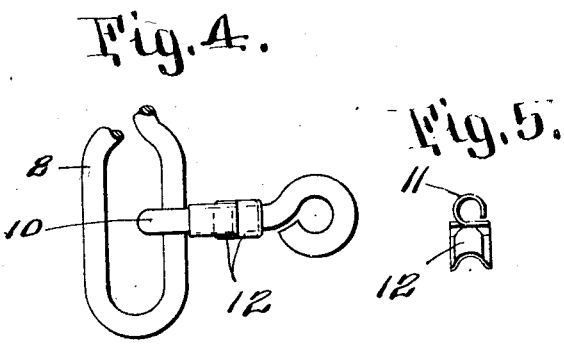
Figure 4 is a fragmentary view, similar to Figure 1, illustrating another modified form of clip and hook at the end of the cross chain.
Figure 5 is a detail view of the clip shown in Figure 4.

As seen in Figures 4 and 5 the end link at each end of the cross chain, instead of being formed with a double hook, may be formed with a single hook or open eye 10 and the clip formed with a single tubular passage 11 and the leaf 12 formed at its free end to straddle the portion of the link opposed to the bill of the hook.

In operation, the clips are removed from the end links of the cross chain and the end links hooked into the links of the side chains; the clips are then placed on the bills of the hooks and pressed on to such bills until the leaf or closure parts thereof snap into the eye, it being understood that the entrances of the eyes are contracted by relatively positioning the bills of the hooks and the portions of the links opposed to the bills, so that they converge.

What I claim is:

1. A fastening link terminating in a hook which forms an eye and means for closing the eye comprising a clip formed with a sleeve slidable on the bill of the hook and a resilient portion extending at an angle from the sleeve and at an angle to the bill of the hook across the open side of the hook and frictionally engaging the shank of the hook opposite the bill.

2. The combination with a chain link in the form of a hook, comprising parallel portions forming a double shank, and a double bill, and a clip having sleeve portions slidable on the double bill, and a closure portion extending across the entrance of the hook, and frictionally engaging the double shank of the hook opposite the bill.

3. The combination of a chain link in the form of a hook, having the end of its bill and the portion of the shank thereof on the opposite side of the entrance of the hook arranged in contracting relation to each other, and a clip having a sleeve portion slidable on the bill and a resilient portion extending across the contracting entrance of the hook, and frictionally engaging the opposing portion of the shank of the hook.

In testimony whereof, I have hereunto signed my name at Syracuse, in the county of Onondaga, and State of New York, this 10 day of May, 1924.

PETER E. BURNS.